United States Patent [19]

Mascola

[11] Patent Number: 5,690,546
[45] Date of Patent: Nov. 25, 1997

[54] EDGE CLAMP APPARATUS

[75] Inventor: James V. Mascola, Emporia, Kans.

[73] Assignee: Vektek, Inc., Emporia, Kans.

[21] Appl. No.: 711,182

[22] Filed: Aug. 30, 1996

[51] Int. Cl.$^6$ .................................................. B24B 41/06
[52] U.S. Cl. ........................... 451/365; 269/32; 269/157
[58] Field of Search ............................. 451/365, 367, 451/387; 269/32, 216, 157

[56] References Cited

U.S. PATENT DOCUMENTS

| | | | |
|---|---|---|---|
| 1,938,337 | 12/1933 | Janiszewski | 269/157 |
| 3,970,296 | 7/1976 | Rameson | 269/32 |
| 4,406,445 | 9/1983 | Seidel | 269/32 |
| 4,830,349 | 5/1989 | Miyata | 269/32 |
| 5,181,701 | 1/1993 | Yonezawa | 269/32 |

*Primary Examiner*—Robert A. Rose
*Attorney, Agent, or Firm*—Hovey, Williams, Timmons & Collins

[57] ABSTRACT

An edge clamp apparatus includes an elongated body 14 defining a cylindrical bore within which a piston 86 is received for movement between retracted and extended positions. The body 14 includes a mounting surface 18 and opposed front and rear body portions, and the bore is formed in the rear portion. The front portion includes a support surface 48 that intersects the cylindrical bore of the rear portion and is inclined relative to the mounting surface by an angle of about 10°. A cap 16 is secured to the front portion of the body 14 for closing off the cylindrical bore of the body and limiting movement of the piston 86. The cap 16 includes an inner surface engaging the support surface 46 of the body 14, and a recess formed in the inner surface for receiving a clamp blade 12. The blade is supported on the support surface of the body within the recess of the cap 16 for movement between a retracted, releasing position and an extended engaging position, and includes a rear portion 70 defining a central longitudinal axis and extending into the cylindrical bore for engagement with the piston, and an opposed front portion 76 presenting a clamp head that is offset from the longitudinal axis such that the head is spaced from the support surface 46 of the body 14.

9 Claims, 3 Drawing Sheets

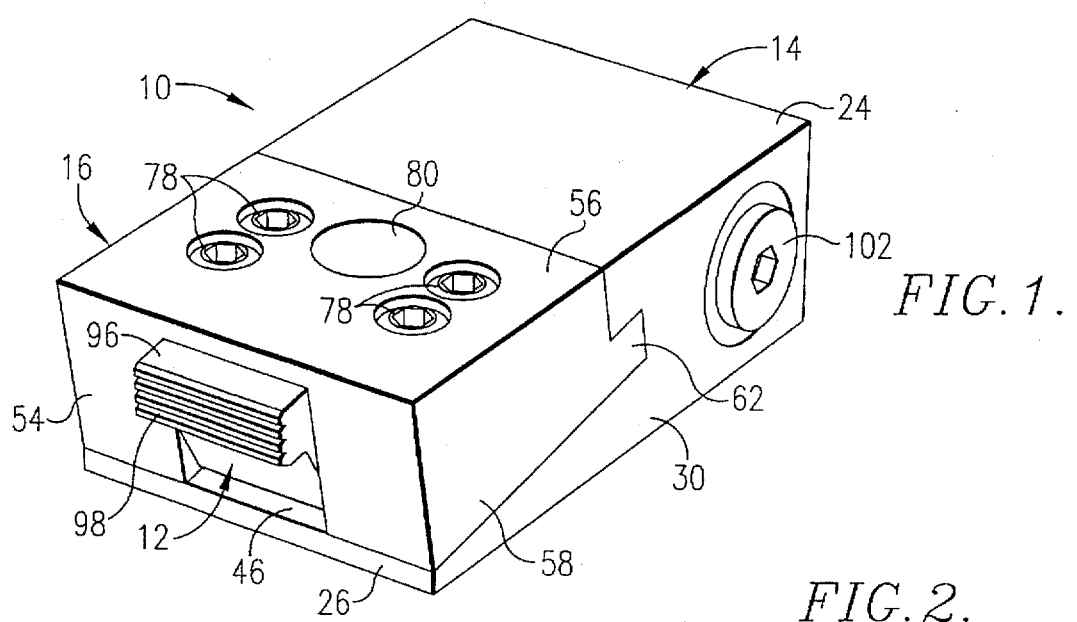
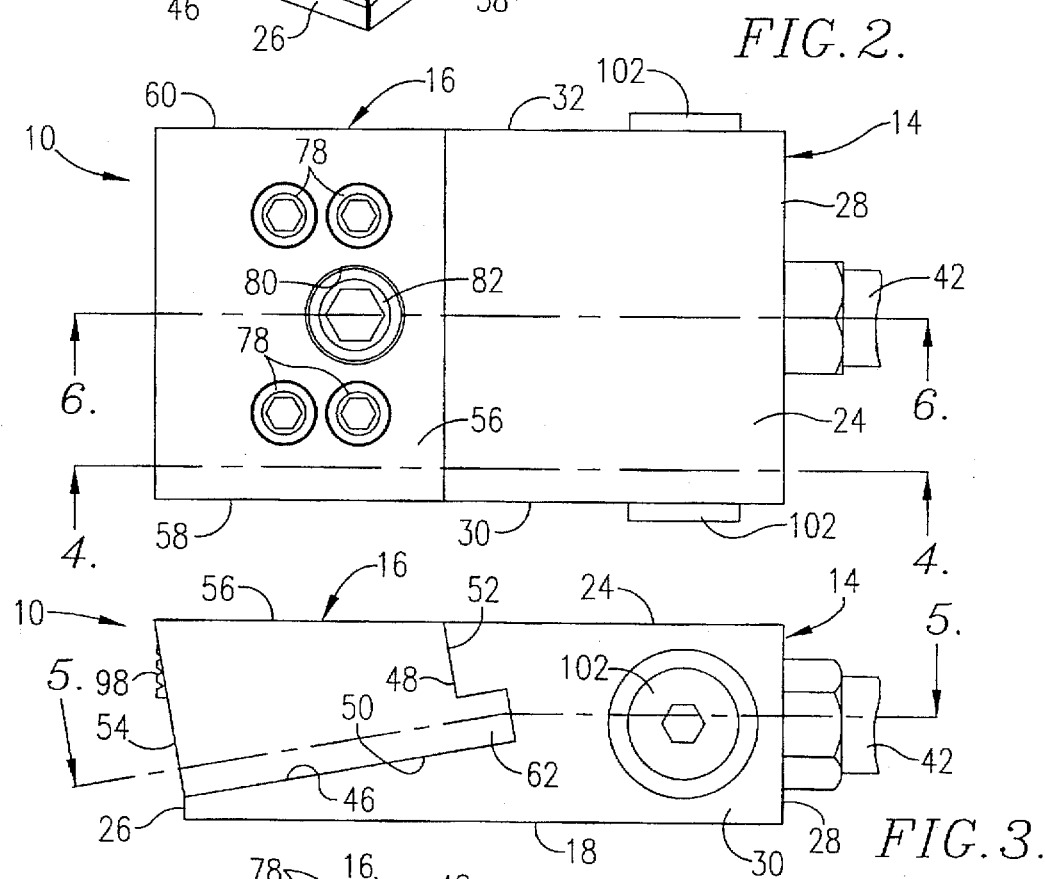
FIG. 1.
FIG. 2.
FIG. 3.
FIG. 4.

5,690,546

1
EDGE CLAMP APPARATUS

BACKGROUND OF THE INVENTION

1. Field of the Invention

The present invention relates generally to fluid-actuated work support devices, and more particularly to a hydraulic edge clamp apparatus having a clamp blade that is shiftable along an incline between gripping and releasing positions.

2. Discussion of the Prior Art

It is known to provide an edge clamp apparatus having an elongated body within which a clamp blade is supported for shiftable movement along an incline between a retracted, releasing position and an extended, gripping position. The body includes a cylindrical bore within which a piston is received, and a fluid port communicates with the bore for connecting the body with a conventional source of hydraulic fluid so that, when fluid is delivered under pressure to the body, the piston forces the clamp blade to the extended, gripping position. A spring assembly is mounted within the body and includes a pair of springs that seat against the clamp blade to bias the blade and piston toward the retracted position so that when fluid pressure is relieved, the blade returns to the released position.

In the known construction, the clamp blade is formed as a generally straight bar having a rectangular cross-sectional shape and a pair of laterally extending arms at the inner end thereof which define seats for the springs. The outer end of the clamp blade presents a head having an engagement surface adapted to engage a work piece in the extended position of the clamp blade. The longitudinal axis of the clamp blade is a straight line intersecting the engagement surface of the head.

Typically, a number of clamp apparatuses are mounted together on a fixture so that they operate collectively to grip a work piece and support it on the fixture while a machining operation such as cutting or grinding is performed. Subsequent to machining, the apparatuses are again actuated to release the work piece.

In order to provide clearance for the machine tool associated with any particular fixture, it is necessary to design the clamp apparatus with a low profile that will not interfere with the desired machining operation. In addition, conventional edge clamp apparatuses move the clamp blade on an incline of about 10° so that when the head engages the work piece it exerts both inward and downward forces that secure the work piece on the fixture. In order to achieve both a low profile and provide a construction that moves the clamp blade along a desirable incline, the conventional construction arranges the clamp blade on the body in such a way that the head engages the fixture at a point very near the support surface of the fixture.

A problem arising in the use of such a construction is that a relatively large gap exists between the point at which the head engages a work piece and the point at which the machining operation is carried out. The work piece would be more securely supported on the fixture if it were possible to grip the work piece at a point higher off of the support surface of the fixture.

OBJECTS AND SUMMARY OF THE INVENTION

It is an object of the present invention to provide an edge clamp apparatus having the same height profile as the conventional construction, but with a clamp blade head that engages a work piece at a point higher off the support surface of a fixture than is achieved through the use of the conventional device.

It is another object of the present invention to provide an edge clamp apparatus having an improved geometry that not only permits improved gripping of a work piece, but also increases the holding force of the apparatus at any given fluid pressure relative to the conventional construction.

In accordance with these and other objects evident from the following description of a preferred embodiment of the invention, an edge clamp apparatus is provided which includes an elongated body and a cap secured thereto. The body includes a mounting surface and opposed front and rear body portions, wherein the rear portion includes a cylindrical bore extending longitudinally through the body in a direction parallel to the mounting surface. The front portion includes a support surface that intersects the cylindrical bore of the rear portion and is inclined relative to the mounting surface by an angle of about 10°.

A piston is received in the cylindrical bore of the body for longitudinal shifting movement between a retracted position and an extended position, and the cap is secured to the front portion of the body for closing off the cylindrical bore of the body and limiting movement of the piston. The cap includes an inner surface engaging the support surface of the body, opposed front and rear ends, and a recess formed in the inner surface and extending between the front and rear ends.

A clamp blade is received within the recess of the cap and is supported on the support surface of the body for movement between a retracted, releasing position and an extended, engaging position. The clamp blade includes a rear portion defining a central longitudinal axis and extending into the cylindrical bore for engagement with the piston, and an opposed front portion presenting a head that is offset from the longitudinal axis of the rear portion such that the head is spaced from the support surface of the body.

By providing an edge clamp apparatus in accordance with the present invention, numerous advantages are realized. For example, by providing a clamp blade having an offset head, it is possible to engage a work piece at the highest possible point off of the support surface of the fixture within the profile presented by the apparatus. In addition, the use of such a geometry increases slightly the holding force exerted on a work piece by the clamp blade for a given fluid pressure relative to conventional constructions.

BRIEF DESCRIPTION OF THE DRAWING FIGURES

The preferred embodiment of the present invention is described in detail below with reference to the attached drawing figures, wherein:

FIG. 1 is perspective view of an edge clamp apparatus constructed in accordance with the preferred embodiment;

FIG. 2 is a top plan view thereof;

FIG. 3 is side elevational view thereof;

FIG. 4 is a sectional view taken along line 4—4 of FIG. 2;

DETAILED DESCRIPTION OF THE PREFERRED EMBODIMENT

Figure 6:
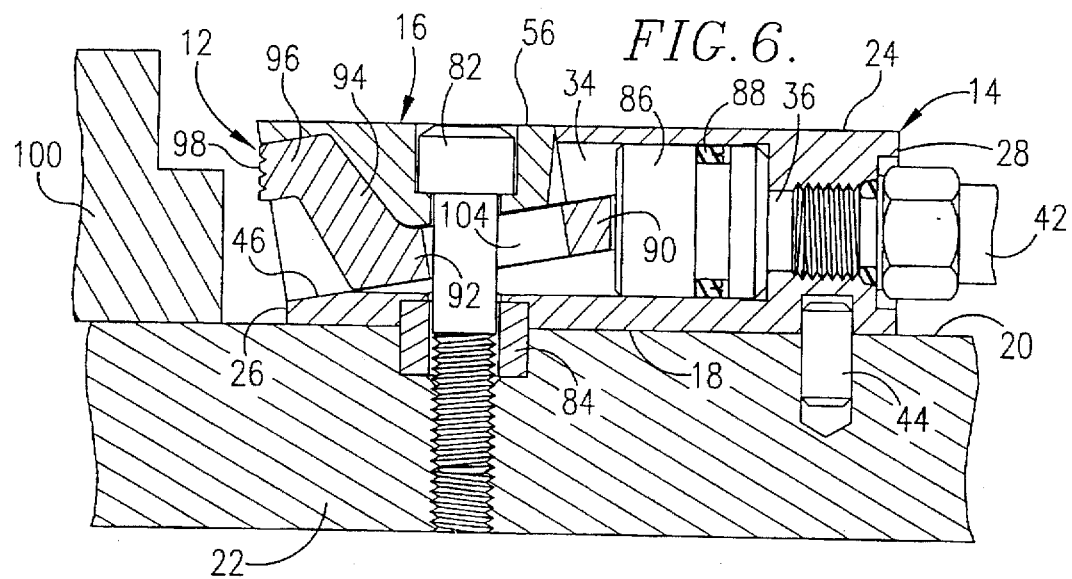
FIG. 6 is a sectional view taken along line 6—6 of FIG. 2, illustrating a clamp blade of the apparatus in a retracted, releasing position.
Figure 7:
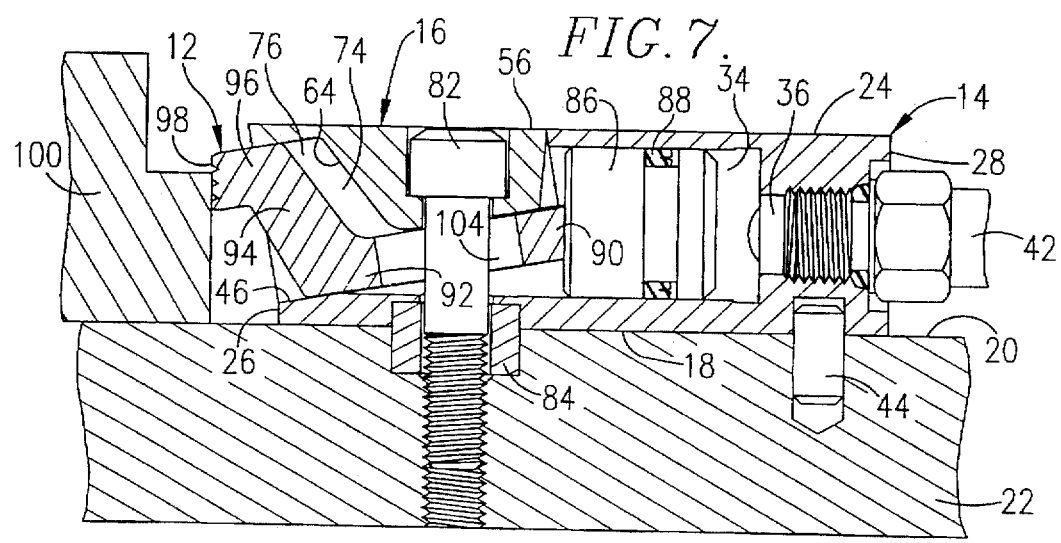
FIG. 7 is a sectional view taken along line 6—6 of FIG. 2, illustrating the clamp blade in an extended, engaging position.

An edge clamp apparatus constructed in accordance with the preferred embodiment is shown in FIG. 1, and broadly includes a body assembly 10 adapted to be secured to the support surface of a fixture, and a clamp blade 12 that is received in the body assembly for shiftable movement between a retracted, releasing position as shown in FIG. 6, and an extended, gripping position as shown in FIG. 7.

Returning to FIG. 1, the body assembly includes a main body 14 and a cap 16. The main body is formed of steel or other suitable metal and, as shown in FIG. 6, includes a lower mounting surface 18 adapted to engage the support surface 20 of a fixture 22. In addition, as shown in FIG. 2, the body presents an upper surface 24 that is parallel to the mounting surface, opposed front and rear end surfaces 26, 28, shown in FIG. 3, each extending perpendicular to the mounting surface 18, and opposed side surfaces 30, 32, shown in FIG. 2, extending perpendicular to both the end surfaces and the mounting surface. As such, the body is of generally rectangular configuration, and the height of the body defines the profile of the clamp apparatus when the apparatus is secured in place on the support surface of a fixture.

Figure 5:
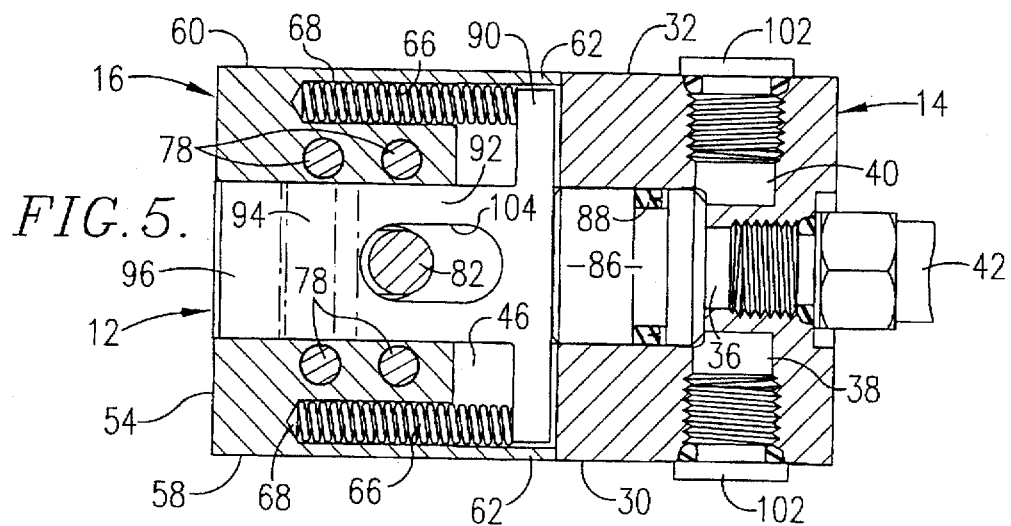
FIG. 5 is a sectional view taken along line 5—5 of FIG. 3.

Turning to FIG. 6, the body 14 is divided into front and rear portions, wherein the front portion is constructed for receipt of the cap 16. The rear portion of the body includes a central cylindrical bore 34 extending longitudinally through the body in a direction parallel to and spaced from the mounting surface 18 and the upper surface 24. The bore terminates at a location spaced from the rear end surface 28 of the body so that the body defines a cylinder that is closed at the rear. As shown in FIG. 5, three ports 36, 38, 40 are provided in the body in communication with the rear of the bore for supplying hydraulic fluid to the bore during operation of the apparatus, and each bore extends through a different one of the surfaces 28, 30, 32 so that a fluid supply line 42 can be connected to the apparatus in any of several different ways. Typically, the layout of one or more edge clamp apparatuses on a fixture dictates the arrangement of the fluid supply lines.

As shown in FIG. 6, a short bore can be formed in the mounting surface of the body adjacent the rear surface for receiving an optional locator pin 44 that secures the rear portion of the body on the fixture 22 against unwanted pivoting movement of the apparatus.

Figure 8:
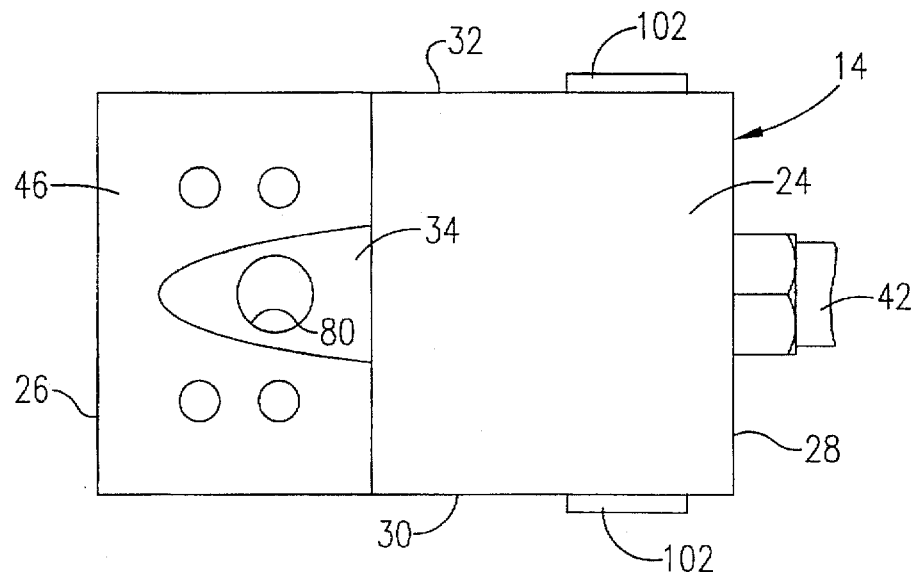
FIG. 8 is a top plan view of a body forming a part of the apparatus.

The front portion of the body includes an upper support surface 46, shown in FIG. 8, that extends inward from the front end surface 26 and intersects the cylindrical bore 34. As shown in FIG. 6, the upper support surface is inclined inward and upward away from the front end surface relative to the mounting surface 18 by an angle of 10°. As shown in FIG. 3, the rear portion of the body presents a front face 48 that extends in a plane perpendicular to the upper support surface 46. The face 48 is stepped, presenting upper and lower portions, wherein the upper portion protrudes forward beyond the lower portion.

Figure 10:
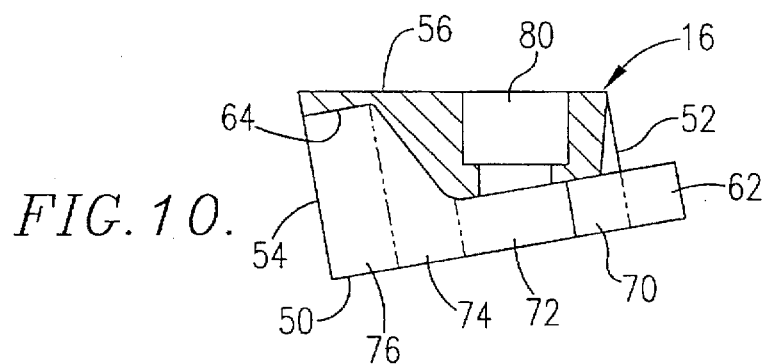
FIG. 10 is a sectional view taken along line 10—10 of FIG. 9.
Figure 9:
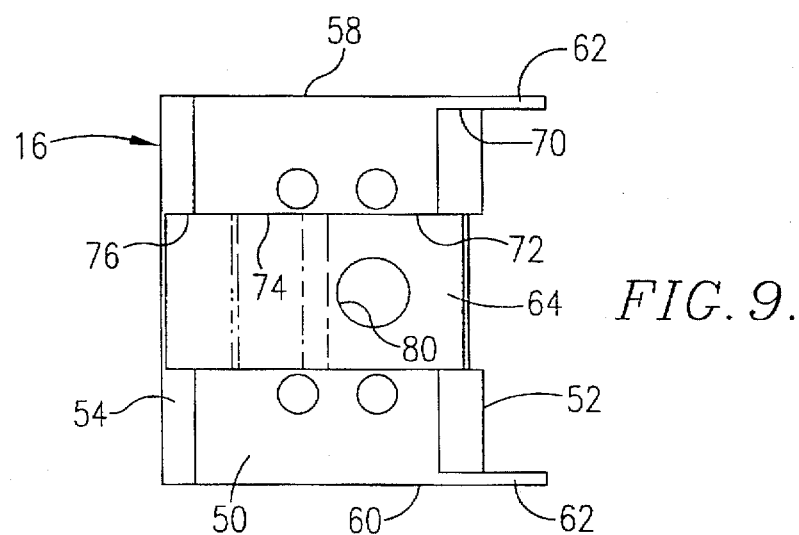
FIG. 9 is a bottom plan view of a cap forming a part of the apparatus.

The cap 16 is also formed of steel or any other suitable metal, and is shaped to mate with the body 14. As shown in FIG. 9, the cap includes an inner, planer surface 50 adapted to be supported on the upper support surface 46 of the body, a rear surface 52, shown in FIG. 4, extending in a direction perpendicular to the inner surface, an opposed front surface 54 extending in a plane parallel to the rear surface, a top surface 56 that is flush with the upper surface 24 of the body, and opposed side surfaces 58, 60, shown in FIG. 2, that are flush with the side surfaces 30, 32 of the body. As shown in FIG. 10, a pair of laterally spaced tabs 62 are formed along the sides of the cap and protrude from the rear surface into the stepped front face of the rear body portion.

A recess is formed in the inner surface of the cap and extends between the front and rear surfaces thereof. The recess is generally of a shape corresponding to the shape of the clamp blade, and includes a support surface 64 opposing and spaced from the support surface of the body. The recess is divided into four stepped, longitudinally spaced sections 70, 72, 74, 76, wherein the rear section 70 is wider than the others, extending almost to the side surfaces of the cap. As shown in FIG. 5, a pair of laterally spaced, longitudinally extending bores 68 extend into the cap through the rear section of the recess. The bores are parallel to the support surface of the cap and to one another, and each bore is sized for receipt of a compression spring 66 that seats against the cap at one end and against the clamp blade at the other end to bias the blade toward a retracted, releasing position, shown in FIG. 6.

Returning to FIG. 9, the section 72 of the recess adjacent the rear section 70 is of a width less than the width of the rear section, and is of a constant height such that the support surface of the cap is spaced a uniform, fixed distance from the support surface of the body along the length of the section. As such, the section 72 presents a uniform, rectangular cross-sectional shape along the length thereof.

The front section 76 of the recess is of the same width as the sections 72, 74, and extends inward from the front surface of the cap. As shown in FIG. 6, the support surface 64 of the cap within the section 76 is parallel to the support surface of the body, but is spaced from the support surface of the body by a distance greater than the distance of separation between the support surfaces 46, 64 along the section 72. Preferably, as shown in FIG. 10, the support surface of the cap is spaced from the top surface 56 by a distance of less than 0.09 inches within the front section 76, such that the portion of the cap overlying the front section 76 defines a thin shroud that protects the recess from exposure to metal filings and the like during use of the apparatus.

The section 74 of the recess adjacent the front section 76 varies in depth between a relatively shallow depth equal to that of the section 72, and a relatively deep depth corresponding to that of the front section 76. Thus, the section is a transitional section between the sections 72, 76. Preferably, the support surface of the cap along the length of the section 74 is angled relative to the support surface along the front section 76 by an angle of about 118°.

As shown in FIG. 1, a set of four bores extend through the cap and into the body for receipt of threaded fasteners 78 that are used to secure the cap in place on the body. Another bore 80 extends completely through the body assembly for receiving a threaded fastener 82, shown in FIG. 6, that is used to mount the apparatus on the support surface of the fixture, as shown in FIG. 6. The bore is perpendicular to and intersects the central longitudinal axes of both the bore in the body and the clamp blade so that when the apparatus is secured in place on a fixture, and the locator pin 44 is not in use, the apparatus is free to pivot about the axis of the fastener 82. As such, if the clamp blade is extended against a work piece presenting an oblique surface, the apparatus is free to pivot about the fastener into an orientation in which the work piece is squarely engaged. Preferably, the bore is countersunk for receipt of a bushing 84 that facilitates such pivoting movement of the apparatus on the fixture during use.

A piston 86 is received within the cylindrical bore of the body, and includes a circumferentially extending groove sized for receipt of a seal ring 88. The seal ring seats against the inner circumferential surface of the bore 34 to prevent hydraulic fluid from leaking around the piston. The piston presents opposed axial end faces that are parallel to one another and perpendicular to the longitudinal axis of the bore. The rear end of the piston is tapered to define an annular space around the piston into which hydraulic fluid can be supplied under pressure in order to extend the piston. The front end face of the piston engages the clamp blade 12 so that the piston shifts the blade to the extended position when fluid pressure is applied at the rear end of the piston through any one of the three ports 36, 38, 40. As described below, when fluid pressure is relieved, the springs 66 return the piston to the retracted position.

As shown in FIG. 5, the clamp blade 12 is formed of steel or any other suitable metal, and is divided into four longitudinally spaced portions 90, 92, 94, 96. The rear portion 90 is sized for receipt within the rear section of the cap recess, and includes a pair of laterally extending arms that protrude beyond the width of the other blade sections 92, 94, 96. Each arm presents a front surface that opposes one of the bores in the cap and defines a seat against which one of the springs 66 bears. The tabs 62, shown in FIG. 10, protrude from the rear surface of the cap on either side of the rear section 70 of the recess to close the recess off from exposure to the cylindrical bore of the body and to provide longitudinal clearance for the rear portion of the blade so that the blade can be shifted between the retracted and extended positions.

As shown in FIG. 6, the blade portions 90, 92 are of equal height, presenting a bottom surface that slides on the support surface of the body, and an upper surface that is parallel to the bottom surface. In addition, the portion 92 is of uniform width, as shown in FIG. 5, being thinner than the rear portion 90 and equal in width to the portions 94, 96. The front portion 96 of the blade includes a bottom surface that is offset from and parallel to the bottom surface of the blade portions, as shown in FIG. 6, and an upper surface that is parallel to the bottom surface. In an exemplary embodiment, where the overall height or profile of the clamp apparatus is 1 inch, the bottom surface of the blade along the front portion 96 is offset from the bottom surface along the portions 90, 92 by about 0.5 inches, positioning the front portion in the upper half of the overall profile of the apparatus.

The portion 94 of the blade adjacent the front portion 96 is a transitional portion connecting the portions 92, 96 together, and includes an upper surface that is angled slightly relative to the bottom surface so that the portion 94 is thicker at the lower end adjacent the portion 92 than at the upper front end thereof. This construction adds material to the blade at the lower end of the portion 94 where strength is needed most in the preferred embodiment.

The blade presents a rear end surface that is disposed within the cylindrical bore of the body and bears against the front face of the piston, as shown in FIG. 6, so that when the piston is extended, it bears against the rear end surface of the blade and shifts the blade to the gripping position. Because the blade is supported for sliding movement along the support surface at an angle to the longitudinal axis of the cylindrical bore, the rear end surface slides down across the front face of the piston as the piston is extended to the position shown in FIG. 7. The recess in the cap guides sliding movement of the blade, while sliding movement of the piston is guided by the cylindrical bore of the body.

As shown in FIG. 1, the blade 12 presents a front end surface 98 that is parallel to the rear end surface, and is roughened, e.g. through the formation of teeth or the like therein. As such, the front end surface is adapted to engage a work piece 100 in the extended position of the blade, shown in FIG. 7, to secure the work piece in place on the fixture. Because the blade 12 is shiftable on an incline relative to the support surface of the fixture, the head defined by the front portion 96 exerts both downward and inward forces on the work piece, and the point at which these forces are applied is spaced above the support surface by a distance of more than about half of an inch. This provides improved holding ability relative to the conventional construction discussed above in which the blade engages the work piece at a point a little as about 0.14 inches above the support surface since the point of engagement in the preferred construction is closer to where the machine tool engages the work piece.

In use, one or more clamp apparatuses constructed in accordance with the preferred embodiment are mounted on the fixture 22 with the mounting surface of each apparatus flush against the support surface 20 of the fixture. Where the apparatuses are to be controlled as a group, a hydraulic circuit is connected to the apparatuses in series, wherein each apparatus is connected with an inlet hose through which fluid is delivered to the apparatus under pressure, and an outlet hose through which the fluid is supplied to another of the apparatuses. Any unused pods in any given apparatus are plugged in a conventional manner by a threaded plug 102 to prevent fluid from leaking from the body.

Prior to supporting a work piece as shown in FIG. 6, fluid pressure to the apparatuses is relieved and the springs 66 of each apparatus bias the clamp blade 12 and piston 86 thereof to the retracted, releasing position. However, once a work piece 100 is positioned on the support surface of the fixture, fluid is delivered under pressure to the cylindrical bore of each apparatus, forcing the piston thereof forward to the extended position. This piston movement shifts the clamp blade along the incline of the support surface into the engaging position shown in FIG. 7, wherein the blade 12 engages the work piece 100 and secures it in place on the fixture 22.

In certain applications, the apparatus is mounted on the fixture 22 by the fastener 82, and the locator pin 44 is not used. With this construction, the apparatus is free to pivot about the fastener as the work piece is engaged so that the clamp blade squarely engages the work piece. In other applications, the locator pin is used to secure the apparatus against pivoting.

Although the invention has been described with reference to the preferred embodiment illustrated in the attached drawing figures, it is noted that substitutions may be made and equivalents employed herein, without departing from the scope of the invention as set forth in the claims.

What is claimed is:

1. An edge clamp apparatus comprising:
   an elongated body including a mounting surface and opposed front and rear body portions, the rear portion including a cylindrical bore extending longitudinally through the body in a direction parallel to the mounting surface, the front portion including a support surface that intersects the cylindrical bore of the rear portion and is inclined relative to the mounting surface, the body defining at least one port in fluid communication with the cylindrical bore of the body;

a piston received in the cylindrical bore for longitudinal shifting movement between a retracted position and an extended position;

a cap secured to the front portion of the body for closing off the cylindrical bore of the body and limiting movement of the piston, the cap including an inner surface engaging the support surface of the body, opposed front and rear ends, and a recess formed in the inner surface and extending between the front and rear ends;

a clamp blade received within the recess of the cap and supported on the support surface of the body for movement between a retracted, releasing position and an extended, engaging position, the clamp blade including a rear portion defining a central longitudinal axis and extending into the cylindrical bore for engagement with the piston, and an opposed front portion that is offset from the longitudinal axis of the rear portion of the clamp blade such that the front portion is spaced from the support surface of the body; and a biasing means for biasing the clamp blade and piston toward the retracted position; wherein the recess in the cap includes a support surface that is stepped to present outer and inner end sections that are parallel to the support surface of the body and an intermediate section that is angled relative to the end sections such that the outer section of the support surface of the recess is spaced further from the support surface of the body than the inner section.

2. An edge clamp apparatus as recited in claim 1, wherein the cap includes an outer surface opposite the inner surface, and the outer end section of the support surface of the recess is within about 0.09 inches of the outer surface of the cap.

3. An edge clamp apparatus comprising:

an elongated body including a mounting surface and opposed front and rear body portions, the rear portion including a cylindrical bore extending longitudinally through the body in a direction parallel to the mounting surface, the front portion including a support surface that intersects the cylindrical bore of the rear portion and is inclined relative to the mounting surface, the body defining at least one port in fluid communication with the cylindrical bore of the body;

a piston received in the cylindrical bore for longitudinal shifting movement between a retracted position and an extended position;

a cap secured to the front portion of the body for closing off the cylindrical bore of the body and limiting movement of the piston, the cap including an inner surface engaging the support surface of the body, opposed front and rear ends, and a recess formed in the inner surface and extending between the front and rear ends;

a clamp blade received within the recess of the cap and supported on the support surface of the body for movement between a retracted, releasing position and an extended, engaging position, the clamp blade including a rear portion defining a central longitudinal axis and extending into the cylindrical bore for engagement with the piston, and an opposed front portion that is offset from the longitudinal axis of the rear portion of the clamp blade such that the front portion is spaced from the support surface of the body; and a biasing means for biasing the clamp blade and piston toward the retracted position; wherein the body and cap define a bore extending in a direction transverse to the mounting surface for permitting the apparatus to be mounted for use, the clamp blade including an elongated slot aligned with the bore for permitting relative shifting movement of the clamp blade when the apparatus is mounted for use.

4. An edge clamp apparatus comprising:

an elongated body including a mounting surface and opposed front and rear body portions, the rear portion including a cylindrical bore extending longitudinally through the body in a direction parallel to the mounting surface, the front portion including a support surface that intersects the cylindrical bore of the rear portion and is inclined relative to the mounting surface, the body defining at least one port in fluid communication with the cylindrical bore of the body, the body having an upper half portion and a lower half portion;

a piston received in the cylindrical bore for longitudinal shifting movement between a retracted position and an extended position;

a cap secured to the front portion of the body for closing off the cylindrical bore of the body and limiting movement of the piston, the cap including an inner surface engaging the support surface of the body, opposed front and rear ends, and a recess formed in the inner surface and extending between the front and rear ends;

a clamp blade received within the recess of the cap and supported on the support surface of the body for movement between a retracted, releasing position and an extended, engaging position, the clamp blade including a rear portion extending into the cylindrical bore for engagement with the piston, and an opposed front portion that is offset from the rear portion of the clamp blade, wherein the front portion of the clamp blade is vertically spaced from the support surface of the body further than the rear portion is spaced from the support surface of the body; and a biasing means for biasing the clamp blade and piston toward the retracted position.

5. An edge clamp apparatus as recited in claim 4, wherein the rear portion of the clamp blade is positioned in the lower half portion of the body and the front portion of the clamp blade is positioned in the upper half portion of the body.

6. An edge clamp apparatus as recited in claim 4, wherein the clamp blade includes a neck connecting the front end portion of the clamp blade with the rear end portion, the neck having a greater cross-sectional area adjacent the rear end portion than adjacent the head.

7. An edge clamp apparatus as recited in claim 4, wherein the front end portion of the clamp blade presents an engagement surface that is angled relative to the mounting surface by an angle of about 90°.

8. An edge clamp apparatus as recited in claim 4, wherein the rear end portion of the clamp blade includes an engagement surface that is angle relative to the mounting surface by an angle of about 90°.

9. An edge clamp apparatus as recited in claim 7, wherein the rear end portion of the clamp blade includes an engagement surface that is parallel to the engagement surface of the front end portion.

\* \* \* \* \*